United States Patent
Jang et al.

(10) Patent No.: US 9,155,002 B2
(45) Date of Patent: Oct. 6, 2015

(54) METHOD FOR PERFORMING HANDOVER DURING DEVICE-TO-DEVICE COMMUNICATION IN WIRELESS ACCESS SYSTEM AND DEVICE FOR SAME

(75) Inventors: Jiwoong Jang, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/125,845

(22) PCT Filed: Jul. 16, 2012

(86) PCT No.: PCT/KR2012/005647
§ 371 (c)(1),
(2), (4) Date: Dec. 12, 2013

(87) PCT Pub. No.: WO2013/012225
PCT Pub. Date: Jan. 24, 2013

(65) Prior Publication Data
US 2014/0135019 A1 May 15, 2014

Related U.S. Application Data

(60) Provisional application No. 61/508,070, filed on Jul. 15, 2011.

(51) Int. Cl.
*H04W 4/00* (2009.01)
*H04W 36/00* (2009.01)
(Continued)

(52) U.S. Cl.
CPC .......... *H04W 36/0016* (2013.01); *H04W 36/30* (2013.01); *H04W 76/043* (2013.01); *H04W 88/04* (2013.01)

(58) Field of Classification Search
CPC ... H04W 4/005; H04W 76/02; H04W 76/023; H04W 84/18; H04W 36/00–36/385; H04L 67/104–67/1093
USPC .......... 455/437, 436, 439, 442; 370/331–334
See application file for complete search history.

(56) References Cited

U.S. PATENT DOCUMENTS

2007/0264933 A1* 11/2007 Kang et al. .................. 455/13.1
2008/0051147 A1* 2/2008 Kwun et al. .................. 455/561
(Continued)

FOREIGN PATENT DOCUMENTS

KR 2007-0059873 6/2007
KR 2009-0004185 1/2009
(Continued)

OTHER PUBLICATIONS

PCT International Application No. PCT/KR2012/005647, Written Opinion of the International Searching Authority dated Jan. 24, 2013, 15 pages.
(Continued)

*Primary Examiner* — Rafael Pérez-Gutiérrez
*Assistant Examiner* — Mark G. Pannell
(74) *Attorney, Agent, or Firm* — Lee, Hong, Degerman, Kang & Waimey

(57) ABSTRACT

A method and apparatus for performing a handover during a device-to-device communication in a wireless access system are disclosed. More particularly, the method comprises: a first device sensing a handover state by considering a link quality with a second device while performing device-to-device communication with the second device; the first device measuring channel quality with respect to neighboring devices by using a reference signal that is transmitted from the neighboring devices; the first device transmitting a handover request message to a relay device in order to start handover the relay device selected from the neighboring devices based on measuring channel quality; the first device receiving from the relay device a handover completion message indicating the completion of resource allocation; and the first device performing the device-to-device communication with the second device by using a resource that is allocated by the relay device.

13 Claims, 9 Drawing Sheets

(51) Int. Cl.
*H04W 76/04* (2009.01)
*H04W 36/30* (2009.01)
*H04W 88/04* (2009.01)

(56) References Cited

U.S. PATENT DOCUMENTS

| | | | |
|---|---|---|---|
| 2008/0056199 A1* | 3/2008 | Park et al. | 370/332 |
| 2009/0116421 A1* | 5/2009 | Kawasaki | 370/312 |
| 2009/0286562 A1* | 11/2009 | Gorokhov | 455/501 |
| 2010/0075663 A1* | 3/2010 | Chang et al. | 455/424 |
| 2010/0220687 A1* | 9/2010 | Reznik et al. | 370/331 |
| 2011/0065378 A1* | 3/2011 | Watanabe | 455/3.01 |
| 2013/0079005 A1* | 3/2013 | Watanabe | 455/435.1 |
| 2013/0102314 A1* | 4/2013 | Koskela et al. | 455/436 |
| 2014/0269638 A1* | 9/2014 | Black et al. | 370/336 |

FOREIGN PATENT DOCUMENTS

| | | |
|---|---|---|
| KR | 2009-0005601 | 1/2009 |
| KR | 2011-0043179 | 4/2011 |

OTHER PUBLICATIONS

PCT International Application No. PCT/KR2012/005647, Written Opinion of the International Searching Authority dated Jan. 24, 2013, 10 pages.

* cited by examiner

METHOD FOR PERFORMING HANDOVER DURING DEVICE-TO-DEVICE COMMUNICATION IN WIRELESS ACCESS SYSTEM AND DEVICE FOR SAME

CROSS-REFERENCE TO RELATED APPLICATIONS

This application is the National Stage filing under 35 U.S.C. 371 of International Application No. PCT/KR2012/005647, filed on Jul. 16, 2012, which claims the benefit of U.S. Provisional Application Ser. No. 61/508,070, filed on Jul. 15, 2011, the contents of which are all hereby incorporated by reference herein in their entirety.

TECHNICAL FIELD

The present invention relates to a radio access system and, more particularly, to a method and device for performing handover for device-to-device communication via a third device while device-to-device (D2D) communication is performed in a radio access system supporting D2D communication.

BACKGROUND ART

In cellular communication, a user equipment (UE) which exists in a cell accesses a base station in order to perform communication, receives control information for transmitting and receiving data to and from the base station, and transmits and receives the data to and from the base station. That is, since the UE transmits and receive data via the base station, the UE transmits data to the base station in order to transmit data to another cellular UE and the base station, which has received the data, transmits the received data to the cellular UE. Since the UE transmits data to another UE via the base station, the base station performs scheduling of a channel and resources for data transmission and reception and transmits channel and resource scheduling information to the UE. In order to perform communication between UEs via the base station, the base station needs to allocate a channel and resources for data transmission and reception. However, device-to-device (D2D) enables a UE to directly transmit and receive a signal to and from another UE without via a base station or a relay.

DISCLOSURE

Technical Problem

An object of the present invention devised to solve the problem lies in a method and device for performing handover to another device in order to perform device-to-device (D2D) communication in a radio access system and, more particularly, in a radio access system supporting D2D communication.

Another object of the present invention is to provide a method and device for continuously performing D2D communication even when link quality deteriorates or a link is disconnected due to external environment change or device mobility after a communication link between devices is established.

The technical problems solved by the present invention are not limited to the above technical problems and other technical problems which are not described herein will become apparent to those skilled in the art from the following description.

Technical Solution

In an aspect of the present invention, provided herein is a method for performing handover during device-to-device (D2D) communication in a radio access system supporting D2D communication, the method including sensing, by a first device, a handover state in consideration of link quality with a second device while performing communication with the second device, measuring, by the first device, channel quality for a neighboring device using a reference signal transmitted from the neighboring device, transmitting, by the first device, a handover request message to a relay device in order to start handover to the relay device selected from among the neighboring device based on the result of measuring channel quality, receiving, by the first device from the relay device, a handover complete message indicating that resource allocation has been completed, and performing, by the first device, D2D communication with the second device via the relay device using resources allocated by the relay device.

In another aspect of the present invention, provided herein is a device for performing handover during device-to-device (D2D) communication in a radio access system supporting D2D communication, the device including a radio frequency (RF) unit configured to transmit and receive a radio signal, and a processor configured to measure channel quality for a neighboring device using a reference signal transmitted from the neighboring device when sensing a handover state in consideration of link quality with another device while performing D2D communication with the another device, to transmit a handover request message to a relay device in order to start handover to the relay device selected from among the neighboring device based on the result of measuring the channel quality, and to perform D2D communication with the another device via the relay device using resources allocated by the relay device when receiving a handover complete message indicating that resource allocation has been completed from the relay device.

The method may further include broadcasting, by the first device, a request message for requesting transmission of the reference signal to the neighboring device.

The method may further include receiving a list of neighboring devices having a channel quality value equal to or greater than a predetermined threshold for the second device from the second device, and the measuring the channel quality may include the first device measuring channel quality for the neighboring device using a reference signal received from a device included in the list.

The method may further include transmitting, by the first device, a list of neighboring devices having a channel quality value equal to or greater than a predetermined threshold to the second device, and the relay device may be selected from among devices belonging to the list based on a channel quality value between a device belonging to the list and the second device.

The method may further include alternately performing, by the first device, communication with the relay device and communication with the second device until receiving the handover complete message from the relay device.

In another aspect of the present invention, provided herein is a method for performing handover during device-to-device (D2D) communication in a radio access system supporting D2D communication, the method including confirming, by a first device, that a second device has requested transmission of a reference signal from a neighboring device while performing D2D communication with the second device, measuring, by the first device, channel quality for the neighboring device using the reference signal transmitted from the neighboring device, transmitting, by the first device, a handover request message to a relay device in order to start handover to the relay device selected from among the neighboring device based on the result of measuring channel quality, receiving, by the first device from the relay device, a handover complete message indicating that resource allocation has been completed, and performing, by the first device, D2D communication with the second device via the relay device using resources allocated by the relay device.

In another aspect of the present invention, provided herein is a device for performing handover during device-to-device (D2D) communication in a radio access system supporting D2D communication including a radio frequency (RF) unit configured to transmit and receive a radio signal and a processor configured to confirm that another device has requested transmission of a reference signal from a neighboring device while performing D2D communication with the another device, to measure channel quality for the neighboring device using the reference signal transmitted from the neighboring device, to transmit a handover request message to a relay device in order to start handover to the relay device selected from among the neighboring device based on the result of measuring the channel quality, and to perform D2D communication with the another device via the relay device using resources allocated by the relay device when receiving a handover complete message indicating that resource allocation has been completed from the relay device.

The confirming may include receiving a request message broadcast to the neighboring device by the second device in order to request transmission of the reference signal and confirming that the second device has requested transmission of the reference signal from the neighboring device.

The confirming may include receiving, from the second device, an indication message indicating that the second device has broadcasted a request message for requesting transmission of the reference signal from the neighboring device and confirming that the second has requested transmission of the reference signal from the neighboring device.

The measuring the channel quality may include the second device measuring channel quality for the neighboring device immediately or a predetermined time elapsed after confirming that the second device has requested transmission of the reference signal from the neighboring device or.

The method may further include the first device receiving a list of neighboring device having a channel quality value equal to or greater than a predetermined threshold for the second device from the second device, and the measuring the channel quality may include measuring channel quality for the neighboring device using a reference signal received from a device included in the list.

The method may further include the first device transmitting a list of neighboring devices having a channel quality value equal to or greater than a predetermined threshold to the second device, and the relay device may be selected from among devices belonging to the list based on a channel quality value between a device belonging to the list and the second device.

The method may further include the first device alternately performing communication with the relay device and communication with the second device until receiving the handover complete message from the relay device.

Advantageous Effects

According to the embodiments of the present invention, it is possible to perform device-to-device (D2D) communication in a radio access system and, more particularly, in a radio access system supporting D2D communication.

According to the embodiments of the present invention, it is possible to continuously perform D2D communication even when link quality deteriorates or a link is disconnected due to external environment change or device mobility after a communication link between devices is established.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Figure 1:
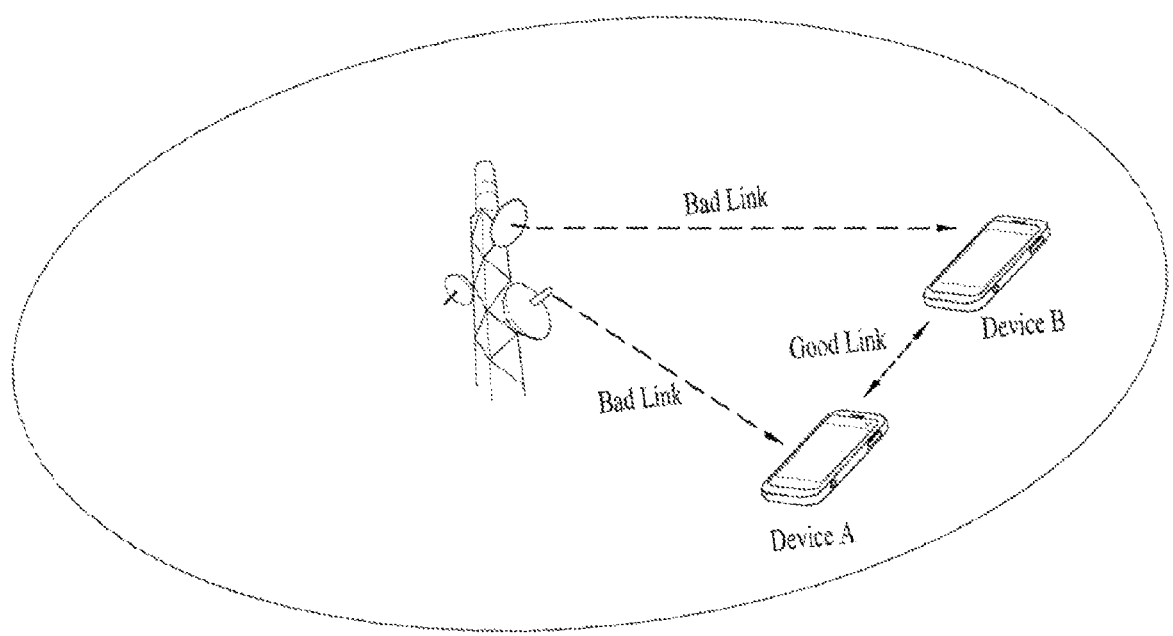
FIG. 1 is a diagram showing an example of performing device-to-device (D2D) communication.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term base station (BS) may be replaced with the terms fixed station, Node-B, eNode-B (eNB), or access point (AP) as necessary. The term relay may be replaced with the terms relay node (RN) or relay station (RS). The term terminal may also be replaced with the term user equipment (UE), mobile station (MS), mobile subscriber station (MSS) or subscriber station (SS).

It should be noted that specific terms disclosed in the present invention are proposed for convenience of description and better understanding of the present invention, and the use of these specific terms may be changed to another format within the technical scope or spirit of the present invention.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of radio access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

1. General UE-to-UE (Device-to-Device) Communication

In the present invention, direct communication between UEs refers to a method of directly performing communication between UEs without via a base station if a channel state between two or more UEs is good or UEs are adjacently located. At this time, UEs exchange data via direct communication but UE-to-UE communication according to the present invention is different from Bluetooth communication, infrared communication, etc. in that predetermined control information for UE-to-UE communication is provided by a base station. Meanwhile, in case of client cooperative communication, a UE B aiding in communication of another UE receives data to be transmitted from a UE A to a base station and transmits the data to the base station or receives data to be transmitted from the base station to the UE A and transmits the data to the UE A. At this time, unidirectional or bidirectional communication between UEs within system bandwidth is performed. Accordingly, client cooperative communication may be regarded as an example of UE-to-UE communication. Client cooperative communication is applicable to uplink transmission via cooperation between UEs and downlink transmission via cooperation between a base station and a UE, cooperation between base stations or cooperation between antennas of a distributed antenna system (DAS).

As described above, although the UE A generally exchanges data and/or control information with the base station via the UE B, the UE A may directly exchange data and/or control data with the base station according to circumstance. That is, the UE A may directly exchange data with the base station in consideration of a channel state with the base station and a channel state with the UE B. At this time, the data and/or control information directly exchanged between the UE A and the base station may be equal to or different from the data and/or control information exchanged with the base station via the UE B.

A wireless communication system may support any one or both of direct communication and client cooperative communication. If a wireless communication system simultaneously supports direct communication and client cooperative communication, messages requesting direct communication and client cooperative communication may be different from and equal to each other. If the same message is used, a direct communication request and a client cooperative communication request may be identified by a 1-bit indicator. Direct communication or client cooperative communication between UEs may be used interchangeably with device-to-device (D2D) communication, MS-to-MS (M2M) communication or peer-to-peer (P2P) communication. Hereinafter, for convenience of description, the term "D2D" communication is used in the embodiments of the present invention. In this specification, the term "D2D device" refers to a UE supporting D2D communication.

In the present invention, all nodes excluding a D2D device are referred to as base stations. For example, a relay node, an antenna node of a distributed antenna system (DAS), etc. are access points for accessing a base station and thus are referred to as base stations. Accordingly, in the embodiments of the present invention, communication with a base station via a relay node belongs to communication between a base station and a D2D device participating in D2D communication.

An object of D2D communication is to conserve power or radio resources as compared with communication between D2D devices via a base station, by directly connecting a link between adjacent D2D devices or D2D devices with a good channel state therebetween to perform D2D communication.

FIG. 1 is a diagram showing an example of performing device-to-device (D2D) communication.

Referring to FIG. 1, an example of performing D2D communication between two D2D devices (device A and device B) located at a cell edge in coverage of a base station is shown. At this time, since a direct link or channel state between D2D devices which are adjacently located at the cell edge is better than a channel state with the base station, if direct D2D communication between D2D devices is performed, radio resources and power can be conserved as compared with communication via the base station.

If a D2D device, which performs D2D communication, has mobility, channel quality between devices which are performing D2D communication may be changed due to device movement and thus the link between devices which are performing D2D communication may be disconnected and data transmission may not be stopped.

2. Method of Performing Handover During D2D Communication

Hereinafter, in the present invention, for seamless data transmission between D2D devices which are performing D2D communication, a method of performing D2D communication using a relay method via a third D2D device while direct communication between D2D devices is performed is proposed. The proposed method is applicable to a method of, at a D2D device which will perform D2D communication, receiving control information from a base station and performing D2D communication with another D2D device based on the received control information and a method of, at a D2D device, independently performing D2D communication with another D2D device without via a base station.

Hereinafter, a relay device which is used as a relay may be a D2D device or a base station (for example, an eNB in an LTE/LTE-A system, an ABS in an 802.16e/m system, etc.) of a cellular network (e.g., an LTE/LTE-A system, 802.16e/m system, etc.). In this case, each D2D device, which is performing D2D communication, performing communication via a base station indicates that each D2D device, which is performing D2D communication, enters a communication mode using a cellular network.

Although the below-described method is described on the assumption of D2D communication between two D2D devices for convenience of description, the present invention is not limited thereto and is equally applicable to the case in which more than two D2D devices simultaneously perform D2D communication.

2.1. Handover Procedure 2.1.1. Device Search

If link quality of D2D communication is decreased to a predetermined threshold or less, a D2D device which is performing D2D communication measures channel quality for neighboring devices and searches for a device suitably used as a relay.

2.1.1.1. Case in which a Reference Signal is not Periodically Transmitted

If devices do not periodically transmit reference signals for measuring channel quality between devices, a D2D device, which is performing D2D communication and wishes to measure channel quality for neighboring devices, transmits a request message (signal) for requesting transmission of reference signals for measuring channel quality between devices to the neighboring devices in a broadcast manner.

The request message for requesting transmission of the reference signal may be broadcast by any one or both of the two D2D devices which perform D2D communication. If the request message for requesting transmission of the reference signal is broadcast by any one of the D2D devices which are performing D2D communication, the D2D device, which has broadcasted the reference signal request message, may separately transmit a notification or indication message (signal) in order to notify the counterpart D2D device which is currently performing D2D communication therewith that the reference signal request message is broadcast.

As described above, if the device which is performing D2D communication broadcasts the reference signal request message, measurement of channel quality for the neighboring devices may start immediately after broadcasting the request message. Alternatively, measurement of channel quality for the neighboring devices may start after a predetermined time has elapsed. In addition, the counterpart D2D device of the D2D device which has broadcasted the reference signal request message may also measure channel quality for the neighboring devices immediately after receiving the notification/indication message or the broadcast reference signal request signal or after a predetermined time has elapsed.

2.1.1.2. Case in which a Reference Signal is Periodically Transmitted

If devices periodically transmit reference signals for measuring channel quality between devices, a D2D device, which is performing D2D communication and wishes to measure channel quality for neighboring devices, receives the reference signals and measures channel quality for the neighboring devices.

2.1.2. Channel Quality Measurement

If D2D communication between D2D devices (a first D2D device and a second D2D device) is performed, in order to perform D2D communication via a third device (relay device), quality of two links among three devices (that is, a link between the first D2D device and the relay device and a link between the second D2D device and the relay device) should be good. Accordingly, although channel quality between devices may be measured by any one of the two D2D devices which are directly performing D2D communication, channel quality is preferably measured by the two D2D devices. At this time, a D2D device, which has sensed a handover state because link quality of D2D communication is decreased to a predetermined threshold or less during D2D communication, may transmit a scan indicator (IND) to the counterpart D2D device such that the counterpart D2D device also starts channel quality measurement. Measurement of channel quality between devices may be performed at the two D2D devices which are performing D2D communication as follows.

2.1.2.1. Case in which a Device, which has Transmitted a Reference Signal Request Message, First Measures Channel Quality A D2D device (first D2D device), which has broadcasted a reference signal request message, between the D2D devices which are performing D2D communication may first measure channel quality for neighboring devices and extract a list of devices having (good) channel quality exceeding a predetermined threshold using the measured result. The D2D device (first D2D device), which has extracted the list of devices having good channel quality, may transmit the extracted list of devices to the counterpart D2D device (second D2D device) which is currently performing D2D communication via device report.

The D2D device (second D2D device), which has received the list, may receive the reference signals of only the devices included in the list and measure channel quality. In other words, channel quality may be measured with respect to the reference signals of the devices included in the list among the reference signals broadcast by the neighboring devices. Subsequently, the D2D device (second D2D device), which has measured channel quality, selects a candidate group composed of one device or a plurality of devices among the devices included in the list and transmits information about a device candidate group or a device selected via device selection to the D2D device (first D2D device) which is currently performing D2D communication. Here, if the D2D device (second D2D device), which has measured channel quality of the devices included in the list, selects and transmits information about one device, the selected device may be determined as a device used as a relay and, if information about the device candidate group is transmitted, the D2D device (first D2D device), which has received information about the device candidate group, may finally determine a device used as a relay among the devices belonging to the device candidate group and inform the counterpart D2D device (second D2D device) of the device used as the relay.

Since only any one of the D2D devices which are performing D2D communication measures channel quality of all channels with the neighboring devices and the counterpart D2D device which is performing D2D communication measures channel quality of only the devices included in the received list, it is possible to obtain gain in terms of device power.

2.1.2.2. Case in which a Device, which has not Transmitted a Reference Signal Request Message, First Measures Channel Quality A counterpart D2D device (second D2D device) which is performing D2D communication with a D2D device (first D2D device), which has broadcasted a reference signal request message, between the D2D devices which are performing D2D communication may first measure channel quality for neighboring devices and extract a list of devices having (good) channel quality exceeding a predetermined threshold using the measured result.

More specifically, since the D2D devices which are performing D2D communication are different in terms of current position thereof, the reference signals of the D2D devices which are received from the neighboring devices may be different. For example, if an area in which the first D2D device may receive the reference signals from the neighboring devices based on the current position thereof is A and an area in which the second D2D device may receive the reference signals from the neighboring devices based on the current position thereof is B, a device located in an overlapping region between the area A and the area B, that is, a device located between two D2D devices which are performing D2D communication is preferably selected as a relay device. As a result, the neighboring devices, which have received the reference signal request message from the D2D device (first D2D device) which has broadcast the reference signal request message, broadcast the reference signals and the reference signals which are received by the counterpart D2D device (second D2D device) among the reference signals broadcast by the neighboring devices may correspond to the reference signals transmitted by the devices located in the overlapping region between the area A and the area B. Accordingly, the counterpart D2D device (second D2D device) which is performing D2D communication may measure channel quality of the neighboring UEs earlier than the D2D device (first D2D device) which has broadcasted the reference signal.

The D2D device (second D2D device), which has extracted the list of the devices having good channel quality, may transmit the extracted list of the devices to the counterpart D2D device (first D2D device) which is currently performing D2D communication via device report.

The D2D device (first D2D device), which has received the list, may measure channel quality of the reference signals of only the devices included in the list among the reference signals broadcast by the devices included in the list. Subsequently, the D2D device (first D2D device), which has measured channel quality, selects a candidate group composed of one device or a plurality of devices among the devices included in the list and transmits information about a device candidate group or a device selected via device selection to the D2D device (second D2D device) which is currently performing D2D communication. Here, if the D2D device (first D2D device), which has measured channel quality of the devices included in the list, selects and transmits information about one device, the selected device may be determined as a device used as a relay and, if information about the device candidate group is transmitted, the D2D device (second D2D device), which has received information about the device candidate group, may finally determine a device used as a relay among the devices belonging to the device candidate group and inform the counterpart D2D device (first D2D device) of the device used as the relay.

If the counterpart D2D device (second D2D device) which is performing D2D communication with the D2D device (first D2D device) which has broadcasted the reference signal firsts measures channel quality, only channel quality of a small number of neighboring devices is measured. Thus, it is possible to obtain gain in terms of power. In addition, if only information about a smaller number of devices is transmitted between D2D devices, it is possible to reduce burden on device list transmission for a relay. In addition, even when only channel quality of the small number of devices is measured, since channel quality of the devices located between D2D devices which are performing D2D communication is measured, it is possible to more rapidly select a third device (relay device) having good link quality with the first D2D device and the second D2D device.

2.1.2.3. Case in which Devices which are Performing D2D Communication Simultaneously Measure Channel Quality Two D2D devices which are performing D2D communication may simultaneously channel quality, exchange a list of UEs with good channel quality and select an optimal device candidate or device candidate group. In this case, the list of third devices (relays) may be transmitted from any one of the two D2D devices which are performing D2D communication to the counterpart D2D device in the form of device report/channel report. Subsequently, the counterpart D2D device, which has received the list, may transmit a finally selected device or device candidate group via device selection/channel response. Here, if the D2D device, which has received the list and has measured channel quality of the devices included in the received list, selects one device and transmits information about the device, the selected device may be determined as a device used as a relay and, if information about the device candidate group is transmitted, the D2D device, which has received the information about the device candidate group, may finally determine a device used as a relay among the devices belonging to the device candidate group and inform the counterpart D2D device of the device used as the relay.

If this method, since the two D2D devices simultaneously measure channel quality for the neighboring UEs, time delay is relatively decreased as compared to the method described in 2.1.2.1.

2.1.3. Link Re-Establishment

After channel quality for the neighboring devices searched for via the process described in 2.1.1. to 2.1.2. is measured and the device or device candidate group used as the relay is selected based on the measured information, if link quality between D2D devices which are performing D2D communication is decreased to a predetermined threshold or less, for seamless data transmission, a link re-establishment process for utilizing a relay may be performed.

Here, the threshold of the link quality used to start the link re-establishment process may be equal to or different from the threshold for measuring the channel quality for the neighboring devices (threshold used to perform the process described in 2.1.1.). If the two thresholds are different, the threshold of the link quality used to start the link re-establishment process is preferably less than the threshold used to measure channel quality for the neighboring devices.

The D2D device which is performing D2D communication transmits handover request (HO REQ) message (or signal) to the relay in order to re-establish a link with a device serving as the relay. At this time, the handover request message may be transmitted from any one or both of the D2D devices, which are performing D2D communication, to the relay.

If only one of the D2D devices which are performing D2D communication transmits the handover request message to the relay, the D2D device, which has transmitted the handover request message, transmits the same handover request message to the counterpart D2D device which is performing D2D communication (D2D device which does not transmit the handover request message) to inform that the handover process starts. In addition, instead of the handover request message, a separate handover indication message (or signal) may be transmitted to inform the counterpart D2D device that the handover process starts.

In addition, if any one of the D2D devices which are performing D2D communication determines the device serving as the relay as described in 2.1.2., a handover indication message (or signal) for informing the counterpart D2D device, which is performing D2D communication, of information about the determined device. In this case, the D2D device, which has received the information about the determined device, may transmit the handover request message to the device which will serve as the relay and transmit, to the counterpart D2D device, a response message indicating that the handover indication message has been received independent of the handover request message. In addition, the D2D device, which has determined the device serving as the relay, may receive the response message to the handover indication message and then transmit the handover request message to the device serving as the relay.

Thereafter, the D2D device, which has received a handover response (HO RSP) message (or signal) in response to the handover request message from the device serving as the relay, may transmit a handover indication message (or a handover indicator (HO-IND)) indicating that handover between two devices has been completed to the counterpart D2D device. Here, if only any one of the D2D devices which are performing D2D communication transmits the handover request message to the relay device and receives a handover response message, the D2D device, which has received the handover response message, may transmit the handover indication message to the counterpart D2D device which is performing D2D communication. In addition, if both the D2D devices which are performing D2D communication transmit the handover request message to the relay device and receive the handover response message, any one of the D2D devices, which have received the handover response message, may transmit the handover indication message to the counterpart D2D device which is performing D2D communication and both the D2D devices, which have received the handover response message, may transmit the handover indication message to the counterpart D2D devices which are performing D2D communication.

2.1.4. Handover Initiation

If the D2D device which is performing D2D communication enters the handover process for continuously performing seamless communication using the counterpart D2D device and the relay through the processes described in 2.1.1. and 2.1.3., a handover mode (HO MOD) for defining operation of the D2D device or handover reentry mode may be set until resources are allocated by the device serving as the relay and a link for D2D communication is completely connected. Hereinafter, for convenience of description, the handover reentry mode is used. The handover reentry mode may be set by receiving an instruction from the relay device via the handover response message or may be set in the D2D device in advance. If the handover reentry mode is set, resources are allocated by the device serving as the relay according to the handover reentry mode and communication with the relay device for handover and existing D2D communication may be alternately performed until a link for D2D communication is connected.

For example, if the handover reentry mode is 1, communication with the relay device for handover and existing D2D communication may be alternately performed until a link for D2D communication via the relay is completely connected and, if the handover reentry mode is 0, existing D2D communication link may be disconnected after the processes described 2.1.1 to 2.1.3 and communication may be performed in the D2D communication mode via the relay. That is, when one or more of the D2D devices which are performing D2D communication receive the handover response message from the relay device or when any one of the D2D devices which are performing D2D communication transmits the handover indication message to the counterpart D2D device, existing D2D communication link may be disconnected and communication may be performed in the D2D communication mode via the relay. In this case, communication delay (halt) may slightly occur until the relay allocates resources for D2D communication link.

In contrast, if the handover reentry mode is 0, communication with the relay device for handover and existing D2D communication may be alternately performed until a link for D2D communication via the relay is completely connected and, if the handover reentry mode is 1, existing D2D communication link may be disconnected after the processes described 2.1.1. to 2.1.3. and communication may be performed in the D2D communication mode via the relay.

2.1.5. Handover Process According to Link Quality

Through the processes described in 2.1.1. to 2.1.4., the D2D device which is performing D2D direct communication may perform handover to a D2D communication mode via the relay device. At this time, in order to prevent the mode from be frequently changed between the D2D direct communication mode and the D2D communication mode via the relay, the handover request process and the handover process may be different in terms of link quality.

Figure 2:
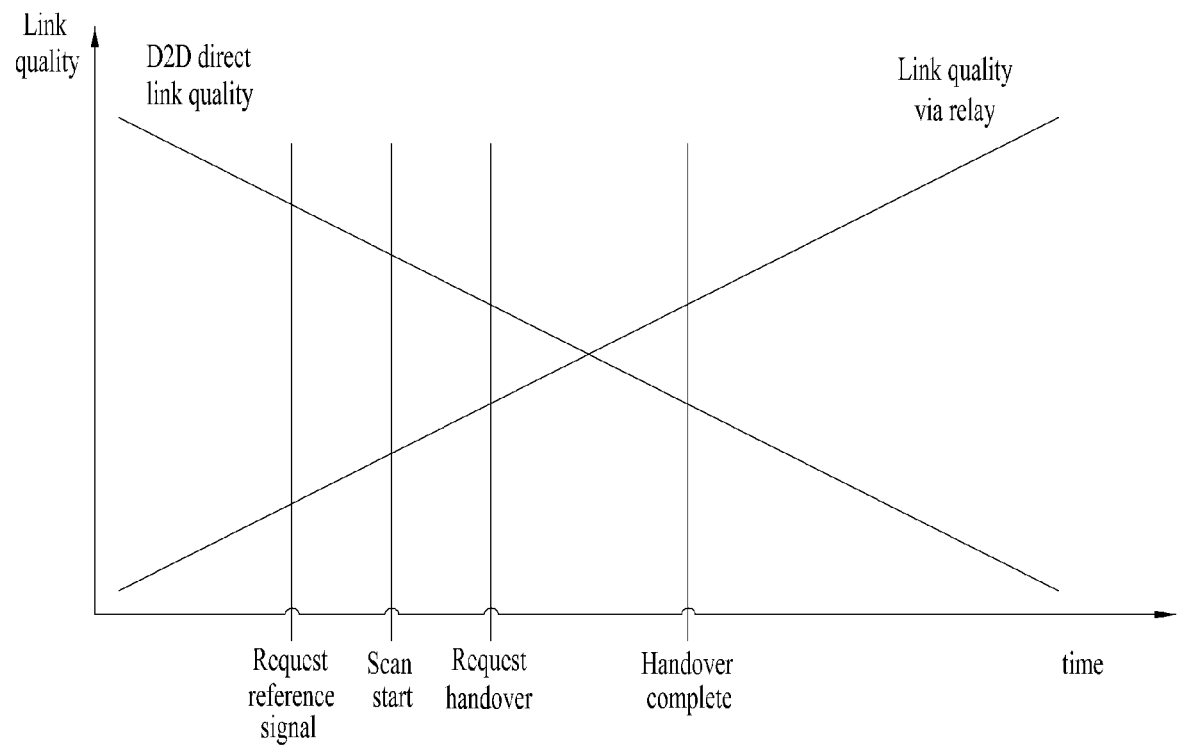
FIG. 2 is a diagram showing a link quality level related to a handover process according to an embodiment of the present invention.

FIG. 2 is a diagram showing a link quality level related to a handover process according to an embodiment of the present invention.

Referring to FIG. 2, the link quality of D2D direct communication between D2D devices which are performing D2D communication and the link quality of D2D communication via the relay are changed with time due to mobility of the D2D devices and the D2D device which is performing D2D communication may start the above-described operations by comparing the link quality and a threshold. At this time, if the link quality of D2D direct communication with the counterpart D2D device which is currently performing D2D communication is decreased to a threshold or less for specific operation, the D2D device may start the specific operation, and if link quality of D2D communication via the relay is increased to the threshold or more for the specific operation, the D2D device may start the specific operation. The above-described operation may start in consideration of the thresholds for the link quality of D2D direct communication and the link quality of D2D communication via the relay. However, FIG. 2 is only exemplary for convenience of description and the thresholds used to start two or more operations may be the same.

2.2. Embodiment of Handover Procedure

Hereinafter, an embodiment of a handover procedure in which the D2D device which is performing D2D communication described in 2.1. performs handover to D2D communication via the relay will be described. The handover method according to the present invention is not limited to the below-described embodiments and at least one of the operations described in 2.1. may be added to the below-described embodiments or at least one of the operations according to the below-described embodiments may be omitted.

2.2.1. First Method

Figure 3:
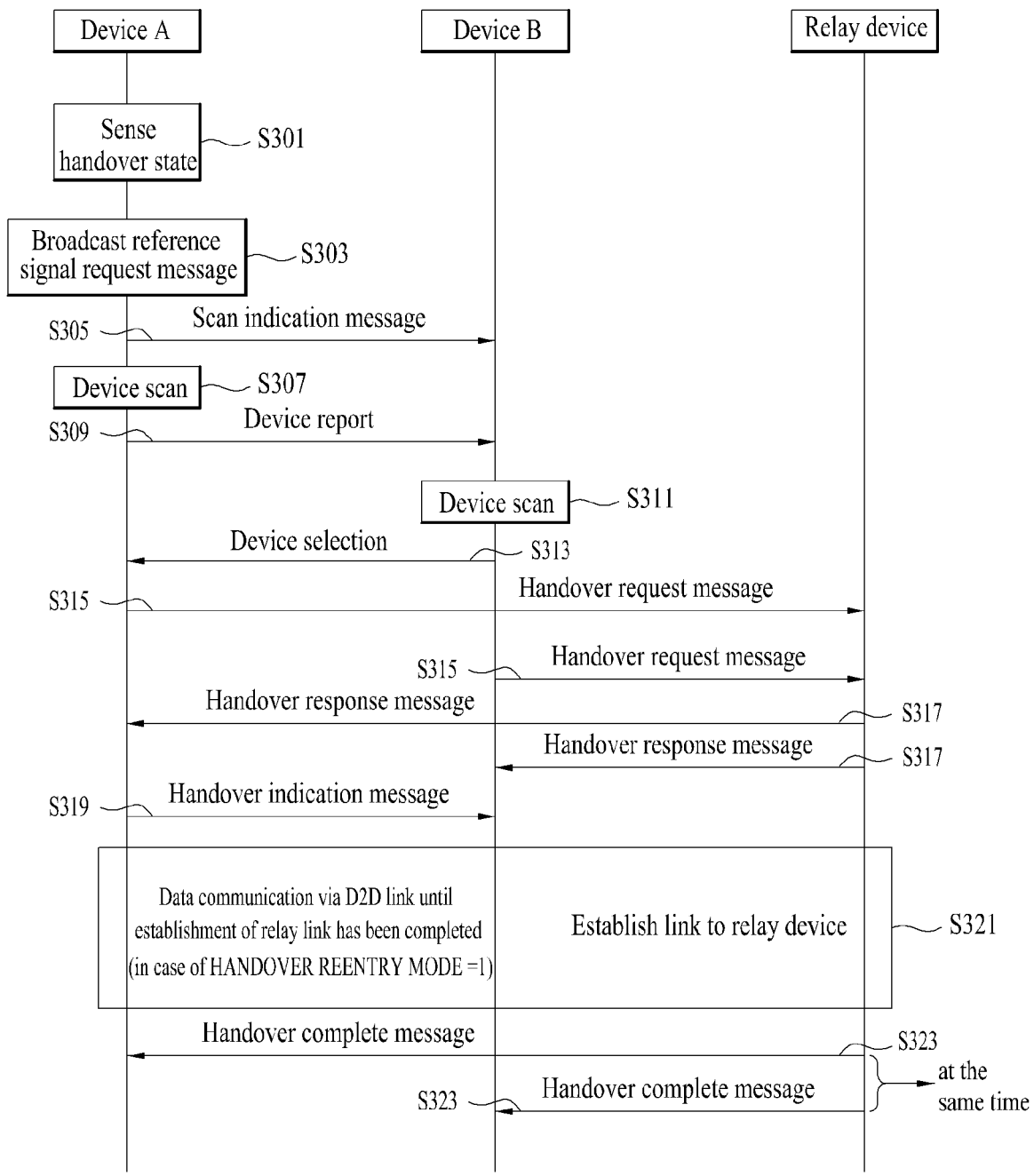
FIGS. 3 to 8 are diagrams showing a method of performing handover during D2D communication according to an embodiment of the present invention.

FIG. 3 is a diagram showing a method of performing handover during D2D communication according to an embodiment of the present invention.

The embodiment shown in FIG. 3 shows the case in which devices do not periodically transmit reference signals for measuring channel quality between the devices (2.1.1.1.) and the case in which a device, which has transmitted a reference signal request message, first measures channel quality (2.1.2.1.).

Referring to FIG. 3, if the link quality of D2D communication is decreased to a predetermined threshold or less while a D2D device A and a D2D device B perform D2D communication, the device A senses a handover state for performing D2D communication via a third D2D device using a relay method (S301). That is, if the link quality of D2D communication is decreased to the predetermined threshold or less, the D2D device which is performing D2D communication measures channel quality for the neighboring devices and starts to search for a device suitably used as a relay.

The device A, which has sensed the handover state, transmits a request message (signal) for requesting transmission of a reference signal for measuring channel quality between devices in a broadcast manner (S303).

The device A, which has broadcasted the reference signal request signal, transmits a scan indication (IND) message to the device B such that the device B starts to measure channel quality for the neighboring devices (S305).

The device A, which has transmitted the scan indication message, scans the neighboring devices (S307). That is, the device A measures channel quality for the neighboring devices using the reference signals received from the neighboring devices.

The device A, which has measured channel quality for the neighboring devices, extracts a list of devices with (good) channel quality exceeding a predetermined threshold and transmits the extracted list of the devices to the device B via device report (S309).

The device B, which has received the list of the devices with good channel quality from the device A, scans the devices included in the list (S311). That is, the device B measures channel quality using the reference signals of only the devices included in the list.

The device B, which has measured channel quality for the neighboring devices included in the list, selects a candidate group composed of one device or a plurality of devices among the devices included in the list and transmits information about the selected device or device candidate group to the device A (S313).

Subsequently, the device A and the device B transmit a handover request message (HO REQ) to the relay device (S315) and receives a handover response message (HO RSP) from the relay device in response thereto (S317). At this time, as described above, only any one of the device A and the device B may transmit the handover request message and receive the handover response message in response thereto. In this case, the counterpart D2D device which has not transmitted the handover request message may be informed that the handover process starts.

The device A, which has received the handover response message from the relay device, transmits a handover indication message (HO IND) indicating that the handover has been completed to the device B (S319). At this time, although not shown, as described above, the device B may also transmit the handover indication message to the device A.

Subsequently, if the handover reentry mode is 1, communication with the relay device for handover and existing D2D communication may be alternately performed until a link for D2D communication between the devices A and B is completely connected and a link re-establishment procedure to the relay device is performed (S321). At this time, if the handover reentry mode is 0, existing D2D communication link may be disconnected and communication may be immediately performed in the D2D communication mode via the relay. In addition, the values of the handover reentry mode may be reversed.

If the relay device allocates resources to completely connect the link for D2D communication between the devices A and B, the relay device transmits a handover complete (HO COMPLT) message indicating that resource configuration has been completed to the devices A and B (S323). At this time, the relay device may transmit the handover complete message when the link with the device A and the device B has been completed. That is, if one link has been completed and the other link has not been completed, the handover compete message is not transmitted. Subsequently, the devices A and B, which have received the handover complete message from the relay device, perform D2D communication using resources allocated by the relay device.

2.2.2. Second Method

Figure 4:
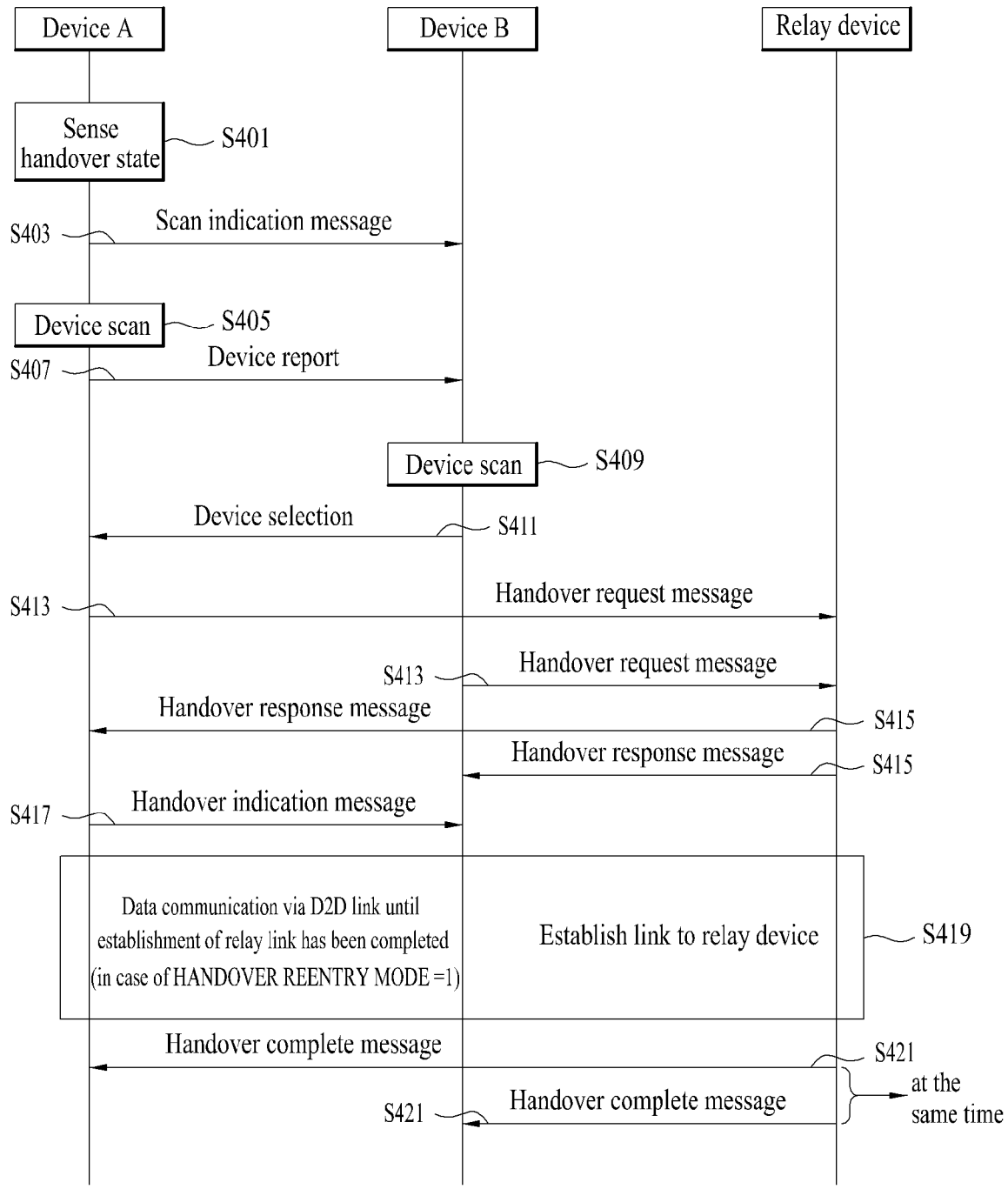

FIG. 4 is a diagram showing a method of performing handover during D2D communication according to an embodiment of the present invention.

The embodiment shown in FIG. 3 shows the case in which devices periodically transmit reference signals for measuring channel quality between the devices (2.1.1.2.) and the case in which a device, which has transmitted a reference signal request message, first measures channel quality (2.1.2.1.).

Referring to FIG. 4, if the link quality of D2D communication is decreased to a predetermined threshold or less while a D2D device A and a D2D device B perform D2D communication, the device A senses a handover state for performing D2D communication via a third D2D device using a relay method (S401). That is, if the link quality of D2D communication is decreased to the predetermined threshold or less, the D2D device which is performing D2D communication measures channel quality for the neighboring devices and starts to search for a device suitably used as a relay.

The device A, which has sensed the handover state, transmits a scan indication (IND) message to the device B such that the device B starts measurement of channel quality for the neighboring devices (S403). That is, since the devices periodically transmit the reference signal for measuring channel quality between devices, the step of, at the device A, broadcasting the request message for requesting broadcasting of the reference signal to the neighboring devices may be omitted.

Hereinafter, steps S405 to S421 are equal to steps S307 to S323 of the embodiment of FIG. 3 and thus a description thereof will be omitted.

2.2.3. Third Method

Figure 5:
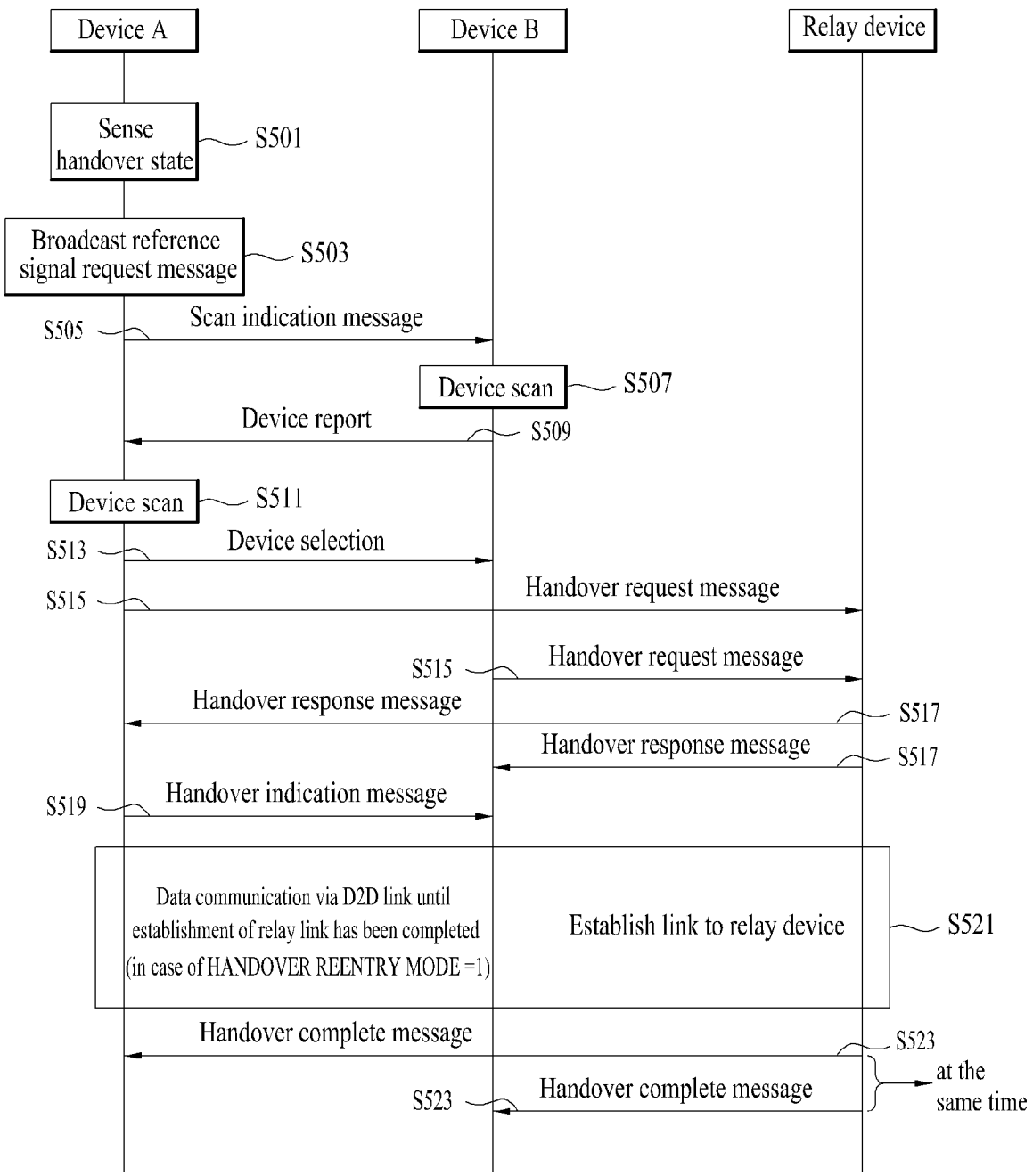

FIG. 5 is a diagram showing a method of performing handover during D2D communication according to an embodiment of the present invention.

The embodiment shown in FIG. 5 shows the case in which devices do not periodically transmit reference signals for measuring channel quality between the devices (2.1.1.1.) and the case in which a device, which has not transmitted a reference signal request message, first measures channel quality (2.1.2.2.).

Referring to FIG. 5, if the link quality of D2D communication is decreased to a predetermined threshold or less while a D2D device A and a D2D device B perform D2D communication, the device A senses a handover state for performing D2D communication via a third D2D device using a relay method (S501). That is, if the link quality of D2D communication is decreased to the predetermined threshold or less, the D2D device which is performing D2D communication measures channel quality for the neighboring devices and starts to search for a device suitably used as a relay.

The device A, which has sensed the handover state, transmits a request message (signal) for requesting transmission of a reference signal for measuring channel quality between devices in a broadcast manner (S503).

The device A, which has broadcasted the reference signal request signal, transmits a scan indication (IND) message to the device B such that the device B starts to measure channel quality for the neighboring devices (S505).

The device B, which has received the scan indication message, scans the neighboring devices (S507). That is, the device B measures channel quality for the neighboring devices using the reference signals received from the neighboring devices.

The device B, which has measured channel quality for the neighboring devices, extracts a list of devices with (good) channel quality exceeding a predetermined threshold and transmits the extracted list of the devices to the device A via device report (S509).

The device A, which has received the list of the devices with good channel quality from the device B, scans the devices included in the list (S511). That is, the device A measures channel quality using the reference signals of only the devices included in the list.

The device A, which has measured channel quality for the neighboring devices included in the list, selects a candidate group composed of one device or a plurality of devices among the devices included in the list and transmits information about the selected device or device candidate group to the device B (S513).

Subsequently, the device A and the device B transmit a handover request message (HO REQ) to the relay device (S515) and receives a handover response message (HO RSP) from the relay device in response thereto (S517). At this time, as described above, only any one of the device A and the device B may transmit the handover request message and receive the handover response message in response thereto. In this case, the counterpart D2D device which has not transmitted the handover request message may be informed that the handover process starts.

The device A, which has received the handover response message from the relay device, transmits a handover indication message (HO IND) indicating that the handover has been completed to the device B (S519). At this time, although not shown, as described above, the device B may also transmit the handover indication message to the device A.

Subsequently, if the handover reentry mode is 1, communication with the relay device for handover and existing D2D communication may be alternately performed until a link for D2D communication between the devices A and B is completely connected and a link re-establishment procedure to the relay device is performed (S521). At this time, if the handover reentry mode is 0, existing D2D communication link may be disconnected and communication may be immediately performed in the D2D communication mode via the relay. In addition, the values of the handover reentry mode may be reversed.

If the relay device allocates resources to completely connect the link for D2D communication between the devices A and B, the relay device transmits a handover complete (HO COMPLT) message indicating that resource configuration has been completed to the devices A and B (S523). At this time, the relay device may transmit the handover complete message when the link with the device A and the device B has been completed. That is, if one link has been completed and the other link has not been completed, the handover compete message is not transmitted. Subsequently, the devices A and B, which have received the handover complete message from the relay device, perform D2D communication using resources allocated by the relay device.

2.2.2. Fourth Method

Figure 6:
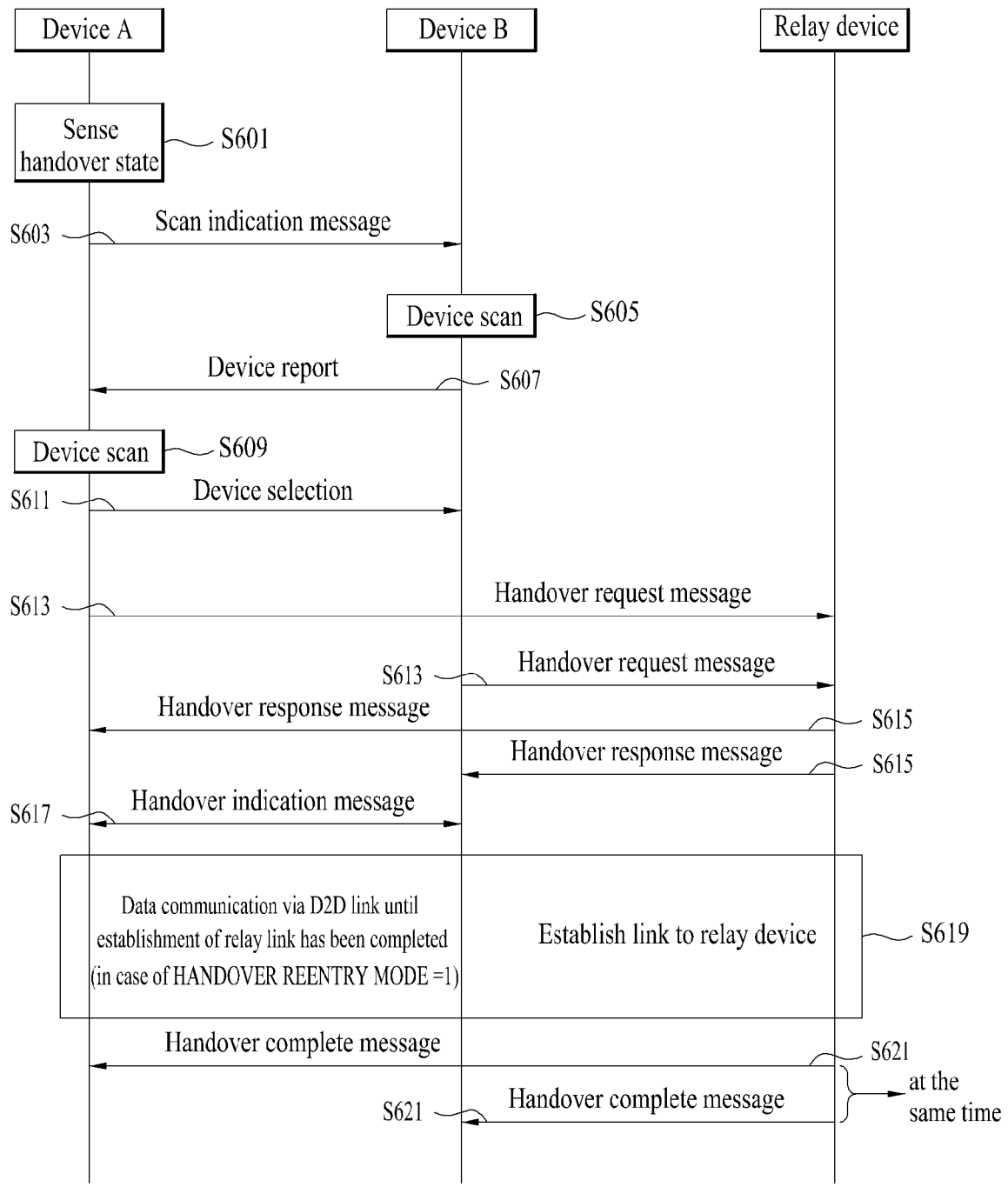

FIG. 6 is a diagram showing a method of performing handover during D2D communication according to an embodiment of the present invention.

The embodiment shown in FIG. 6 shows the case in which devices periodically transmit reference signals for measuring channel quality between the devices (2.1.1.2.) and the case in which a device, which has not transmitted a reference signal request message, first measures channel quality (2.1.2.2.).

Referring to FIG. 6, if the link quality of D2D communication is decreased to a predetermined threshold or less while a D2D device A and a D2D device B perform D2D communication, the device A senses a handover state for performing D2D communication via a third D2D device using a relay method (S601). That is, if the link quality of D2D communication is decreased to the predetermined threshold or less, the D2D device which is performing D2D communication measures channel quality for the neighboring devices and starts to search for a device suitably used as a relay.

The device A, which has sensed the handover state, transmits a scan indication (IND) message to the device B such that the device B starts measurement of channel quality for the neighboring devices (S603). That is, since the devices periodically transmit the reference signals for measuring channel quality between devices, the step of, at the device A, broadcasting the request message for requesting broadcasting of the reference signal to the neighboring devices may be omitted.

Hereinafter, steps S605 to S621 are equal to steps S507 to S523 of the embodiment of FIG. 5 and thus a description thereof will be omitted.

2.2.3. Fifth Method

Figure 7:
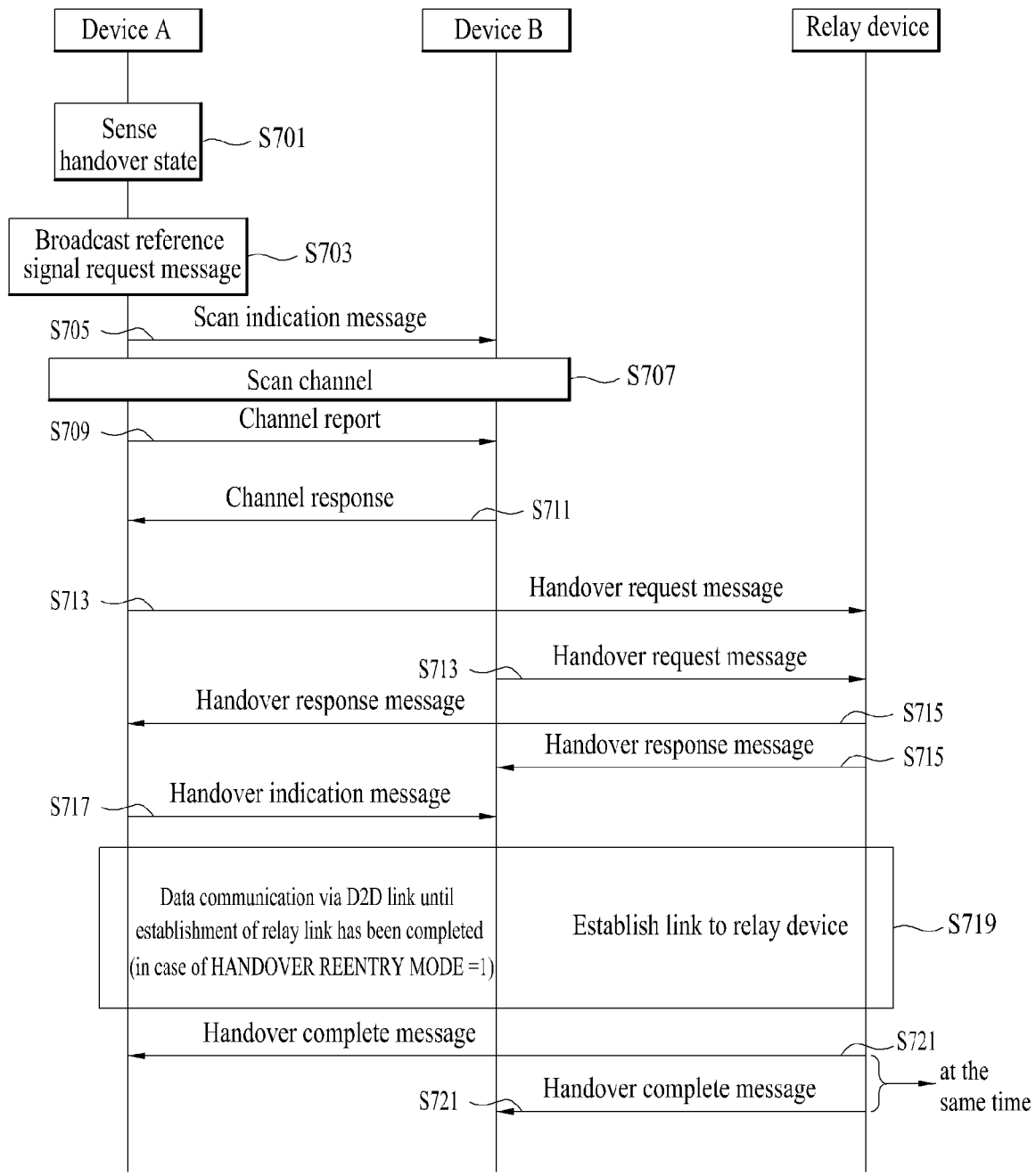

FIG. 7 is a diagram showing a method of performing handover during D2D communication according to an embodiment of the present invention.

The embodiment shown in FIG. 7 shows the case in which devices do not periodically transmit reference signals for measuring channel quality between the devices (2.1.1.1.) and the case in which devices which are performing D2D communication simultaneously measure channel quality (2.1.2.3.).

Referring to FIG. 7, if the link quality of D2D communication is decreased to a predetermined threshold or less while a D2D device A and a D2D device B perform D2D communication, the device A senses a handover state for performing D2D communication via a third D2D device using a relay method (S701). That is, if the link quality of D2D communication is decreased to the predetermined threshold or less, the D2D device which is performing D2D communication measures channel quality for the neighboring devices and starts to search for a device suitably used as a relay.

The device A, which has sensed the handover state, transmits a request message (signal) for requesting transmission of a reference signal for measuring channel quality between devices in a broadcast manner (S703).

The device A, which has broadcasted the reference signal request signal, transmits a scan indication (IND) message to the device B such that the device B starts to measure channel quality for the neighboring devices (S705).

The devices A and B, which are performing D2D communication, scan the neighboring devices (S707). That is, the devices A and B measure channel quality for the neighboring devices using the reference signals received from the neighboring devices.

The device A, which has measured channel quality for the neighboring devices, extracts a list of devices with (good) channel quality exceeding a predetermined threshold and transmits the extracted list of the devices to the device B via device report (S709).

The device B, which has received the list of the devices with good channel quality from the device A, transmits a finally selected device or device candidate group using the received list and measurement information of channel quality for the neighboring devices via device selection/channel response (S711).

Subsequently, the device A and the device B transmit a handover request message (HO REQ) to the relay device (S713) and receives a handover response message (HO RSP) from the relay device in response thereto (S715). At this time, as described above, only any one of the device A and the device B may transmit the handover request message and receive the handover response message in response thereto. In this case, the counterpart D2D device which has not transmitted the handover request message may be informed that the handover process starts.

The device A, which has received the handover response message from the relay device, transmits a handover indication (HO IND) indicating that the handover has been completed to the device B (S717). At this time, although not shown, as described above, the device B may also transmit the handover indication message to the device A.

Subsequently, if the handover reentry mode is 1, communication with the relay device for handover and existing D2D communication may be alternately performed until a link for D2D communication between the devices A and B is completely connected and a link re-establishment procedure to the relay device is performed (S719). At this time, if the handover reentry mode is 0, existing D2D communication link may be disconnected and communication may be immediately performed in the D2D communication mode via the relay. In addition, the values of the handover reentry mode may be reversed.

If the relay device allocates resources to completely connect the link for D2D communication between the devices A and B, the relay device transmits a handover complete (HO COMPLT) message indicating that resource configuration has been completed to the devices A and B (S721). At this time, the relay device may transmit the handover complete message when the link with the device A and the device B has been completed. That is, if one link has been completed and the other link has not been completed, the handover compete message is not transmitted. Subsequently, the devices A and B, which have received the handover complete message from the relay device, perform D2D communication using resources allocated by the relay device.

2.2.6. Sixth Method

Figure 8:
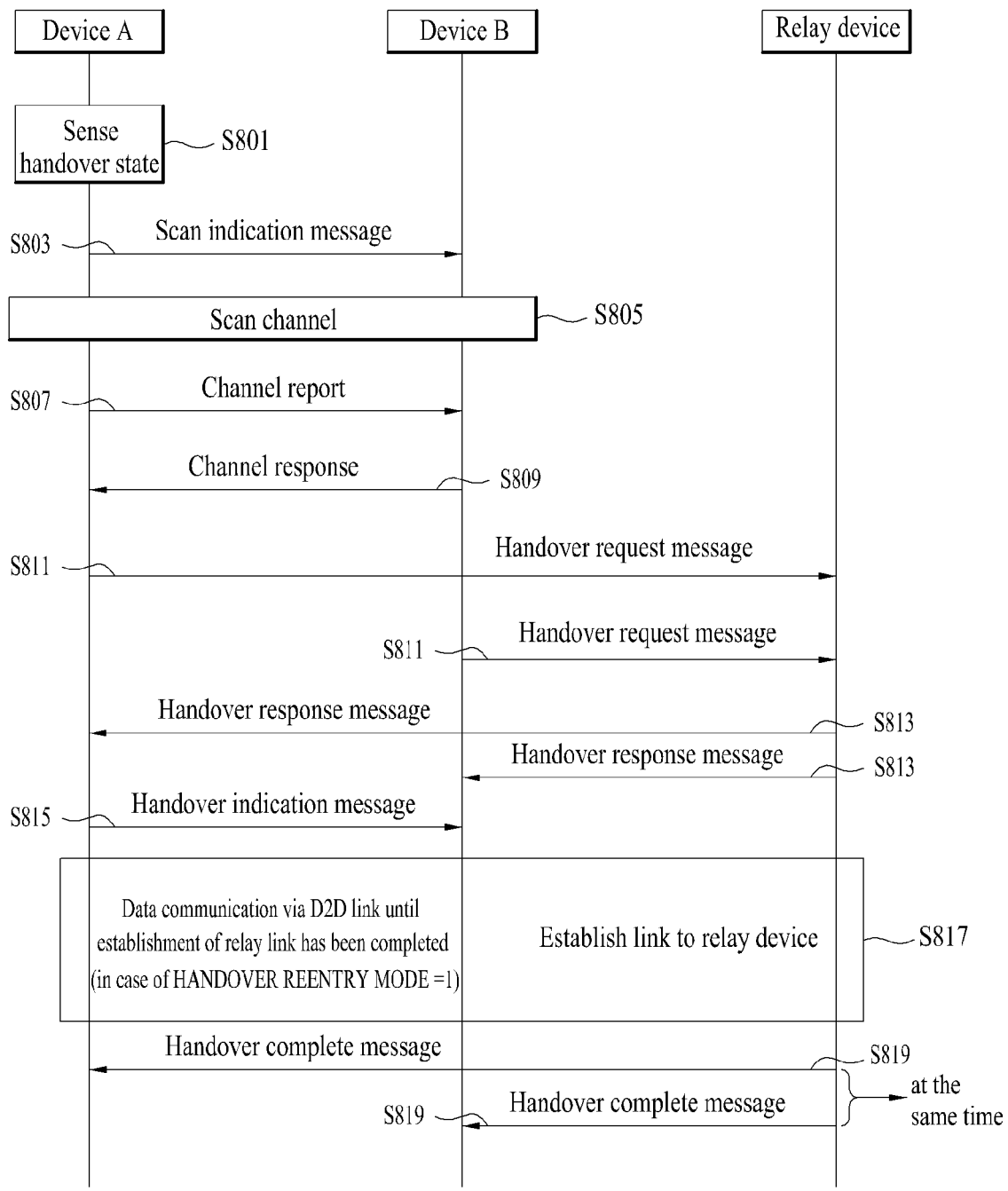

FIG. 8 is a diagram showing a method of performing handover during D2D communication according to an embodiment of the present invention.

The embodiment shown in FIG. 8 shows the case in which devices periodically transmit reference signals for measuring channel quality between the devices (2.1.1.2.) and the case in which devices which are performing D2D communication simultaneously measure channel quality (2.1.2.3.).

Referring to FIG. 8, if the link quality of D2D communication is decreased to a predetermined threshold or less while a D2D device A and a D2D device B perform D2D communication, the device A senses a handover state for performing D2D communication via a third D2D device using a relay method (S801). That is, if the link quality of D2D communication is decreased to the predetermined threshold or less, the D2D device which is performing D2D communication measures channel quality for the neighboring devices and starts to search for a device suitably used as a relay.

The device A, which has sensed the handover state, transmits a scan indication (IND) message to the device B such that the device B starts measurement of channel quality for the neighboring devices (S803). That is, since the devices periodically transmit the reference signal for measuring channel quality between devices, the step of, at the device A, broadcasting the request message for requesting broadcasting of the reference signal to the neighboring devices may be omitted.

Hereinafter, steps S805 to S819 are equal to steps S707 to S721 of the embodiment of FIG. 7 and thus a description thereof will be omitted.

3. General Device to which the Present Invention is Applicable

Figure 9:
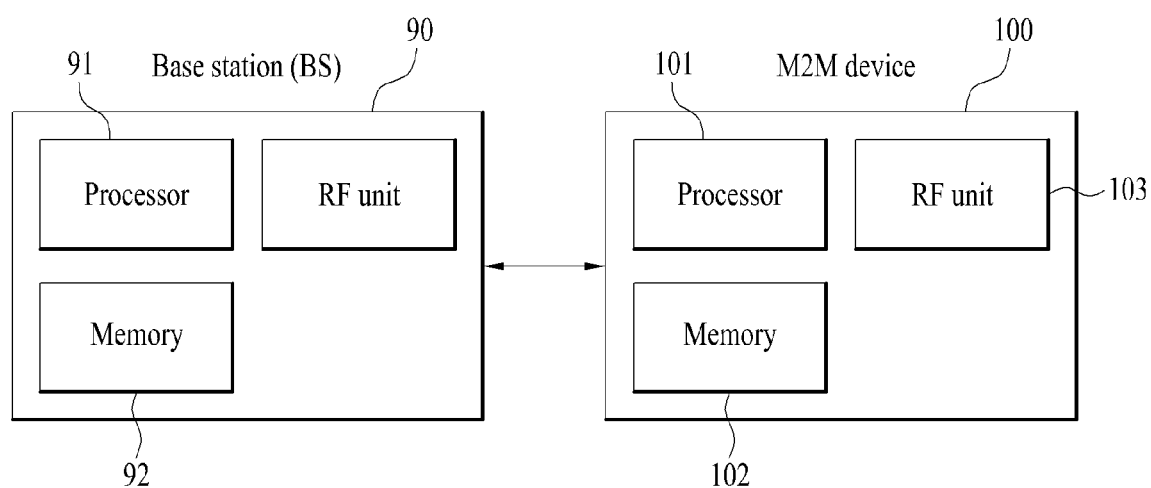
FIG. 9 is a block diagram showing a wireless communication device according to an embodiment of the present invention.

FIG. 9 is a block diagram showing a wireless communication device according to an embodiment of the present invention.

Referring to FIG. 9, the wireless communication system includes a base station (BS) (90) and a plurality of D2D devices 100 located in an area of the BS 90. Although FIG. 9 shows an example in which the BS 90 and the D2D devices 100 perform communication, the D2D communication method according to the present invention may be performed between D2D devices and the D2D devices may have the same configuration as FIG. 9 and perform the methods according to the above-described embodiments. In addition, as described above, the above-described relay device may be a D2D device or a BS.

The BS 90 includes a processor 91, a memory 92 and a radio frequency (RF) unit 93. The processor 91 implements the proposed functions, procedures and/or methods. Layers of a radio interface protocol may be implemented by the processor 91. The memory 92 is connected to the processor 91 to store a variety of information for driving the processor 91. The RF unit 93 is connected to the processor 91 to transmit and/or receive a radio signal.

The D2D device 100 includes a processor 101, a memory 102 and a radio frequency (RF) unit 103. The processor 101 implements the proposed functions, procedures and/or methods. Layers of a radio interface protocol may be implemented by the processor 101. The memory 102 is connected to the processor 101 to store a variety of information for driving the processor 101. The RF unit 103 is connected to the processor 101 to transmit and/or receive a radio signal.

The memories 92 and 102 may be located inside or outside the processors 91 and 101 and may be connected to the processors 91 and 101 by well-known means, respectively. In addition, the BS 90 and/or the D2D device 100 may have a single antenna or multiple antennas.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The methods proposed by the present invention are applicable to various radio access systems in addition to a 3GPP LTE/LTE-A system and an IEEE 802 system.

The invention claimed is:

1. A method for performing handover during a direct communication between a first user equipment (UE) and a second UE in a wireless communication system supporting the direct communication, the method comprising:
sensing, by the first UE, a handover state in consideration of link quality with the second UE while performing communication with the second device;
measuring, by the first UE, channel quality for a candidate group of neighboring devices using a reference signal transmitted from the candidate group of neighboring devices;
selecting, by the first UE, a relay device from the candidate group of neighboring devices;
transmitting, by the first UE to the relay device, a handover request message in order to start handover to the relay device;
receiving, by the first UE from the relay UE, a handover complete message indicating that resource allocation has been completed; and
performing, by the first UE, communication with the second UE via the relay device using resources allocated by the relay device,
wherein selecting the relay device includes:
receiving, by the first UE from the second UE, a list of neighboring devices having a channel quality value equal to or greater than a threshold for the second UE, the list of neighboring devices being constructed by the second UE based on the second UE measuring channel quality for the candidate group of neighboring devices, and
determining, by the first UE, the relay device based on the list of neighboring devices and a result of measuring channel quality for the candidate group of neighboring devices,
wherein measuring channel quality for the candidate group of neighboring devices by the first UE and measuring channel quality for the candidate group of neighboring devices by the second UE are simultaneously performed.

2. The method according to claim 1, further comprising:
broadcasting, by the first UE to the candidate group of neighboring devices, a request message for requesting transmission of the reference signal.

3. The method according to claim 2, wherein the measuring channel quality for the candidate group of neighboring devices by the first UE and measuring channel quality for the candidate group of neighboring devices by the second UE are performed immediately or a predetermined time elapsed after broadcasting the request message for requesting transmission of the reference signal to the candidate group of neighboring devices.

4. The method according to claim 1, further comprising:
transmitting, by the first UE to the second UE, a message indicating that the relay device has been selected.

5. The method according to claim 1, further comprising:
alternately performing, by the first UE, communication with the relay device and communication with the second UE until receiving the handover complete message from the relay device.

6. A method for performing handover during a direct communication between a first user equipment (UE) and a second UE in a wireless communication system supporting the direct communication, the method comprising:
confirming, by the first UE, that the second UE has requested transmission of a reference signal from a candidate group of neighboring devices while performing communication with the second UE;
measuring, by the first UE, channel quality for the candidate group of neighboring devices using the reference signal transmitted from the candidate group of neighboring devices;
selecting, by the first UE, a relay device from the candidate group of neighboring devices;
transmitting, by the first UE to the relay device, a handover request message in order to start handover to the relay device;
receiving, by the first UE from the relay device, a handover complete message indicating that resource allocation has been completed; and
performing, by the first UE, communication with the second UE via the relay device using resources allocated by the relay device,
wherein selecting the relay device includes:
receiving, by the first UE from the second UE, a list of neighboring devices having a channel quality value equal to or greater than a threshold for the second UE, the list of neighboring devices being constructed by the second UE based on the second UE measuring channel quality for the candidate group of neighboring devices, and
determining, by the first UE, the relay device based on the list of neighboring devices and a result of measuring channel quality for the candidate group of neighboring devices, wherein measuring channel quality for the candidate group of neighboring devices by the first UE and measuring channel quality for the candidate group of neighboring devices by the second UE are simultaneously performed.

7. The method according to claim 6, wherein the confirming includes:
receiving a request message broadcasted to the candidate group of neighboring devices by the second UE in order to request transmission of the reference signal,. and
confirming that the second UE has requested transmission of the reference signal from the candidate group of neighboring devices.

8. The method according to claim 6, wherein the confirming includes:
receiving, from the second UE, an indication message indicating that the second UE has broadcasted a request message for requesting transmission of the reference signal from the candidate group of neighboring devices, and
confirming that the second UE has requested transmission of the reference signal from the candidate group of neighboring devices.

9. The method according to claim 6, wherein measuring channel quality for the candidate group of neighboring devices by the first UE and measuring channel quality for the candidate group of neighboring devices by the second UE are performed immediately after confirming that the second UE has requested transmission of the reference signal from the neighboring device or after a predetermined time has elapsed.

10. The method according to claim 6, further comprising:
transmitting, by the first UE to the second UE, a message indicating that the relay device has been selected.

11. The method according to claim 6, further comprising alternately performing, by the first UE, communication with the relay device and communication with the second UE until receiving the handover complete message from the relay device.

12. A device for performing handover during a direct communication with another device in a wireless communication system supporting the direct communication, the device comprising:
a radio frequency (RF) unit configured to transmit and receive a radio signal; and
a processor configured to:
sense a handover state in consideration of link quality with the another device while performing communication with the another device;
measure channel quality for a candidate group of neighboring devices using a reference signal transmitted from the candidate group of neighboring devices;
select a relay device from the candidate group of neighboring devices;
transmit a handover request message to the relay device in order to start handover to the relay device;
receive, from the relay device, a handover complete message indicating that resource allocation has been completed; and
perform communication with the another device via the relay device using resources allocated by the relay device,
wherein selecting the relay device includes:
receiving, from the another device, a list of neighboring devices having a channel quality value equal to or greater than a threshold for the another device, the list of neighboring devices being constructed by the another device based on the another device measuring channel quality for the candidate group of neighboring devices, and
determining the relay device based on the list of neighboring devices and a result of measuring channel quality for the candidate group of neighboring devices,
wherein measuring channel quality for the candidate group of neighboring devices by the device and measuring channel quality for the candidate group of neighboring devices by the another device are simultaneously performed.

13. A device for performing handover during a direct communication with another device in a wireless communication system supporting the direct communication, the device comprising:
a radio frequency (RF) unit configured to transmit and receive a radio signal; and
a processor configured to
confirm that the another device has requested transmission of a reference signal from a candidate group of neighboring devices while performing communication with the another device;
measure channel quality for the candidate group of neighboring devices using the reference signal transmitted from the candidate group of neighboring devices;
select a relay device from the candidate group of neighboring devices;
transmit a handover request message to the relay device in order to start handover to the relay device;
receive, from the relay device, a handover complete message indicating that resource allocation has been completed; and
perform communication with the another device via the relay device using resources allocated by the relay device,
wherein selecting the relay device includes:
receiving, from the another device, a list of neighboring devices having a channel quality value equal to or greater than a threshold for the another device, the list of neighboring devices being constructed by the another device based on the another device measuring channel quality for the candidate group of neighboring devices, and
determining the relay device based on the list of neighboring devices and a result of measuring channel quality for the candidate group of neighboring devices,
wherein measuring channel quality for the candidate group of neighboring devices by the device and measuring channel quality for the candidate group of neighboring devices by the another device are simultaneously performed.

* * * * *